(No Model.) 3 Sheets—Sheet 1.
C. W. BALDWIN.
SAFETY APPARATUS FOR ELEVATORS.
No. 258,691. Patented May 30, 1882.
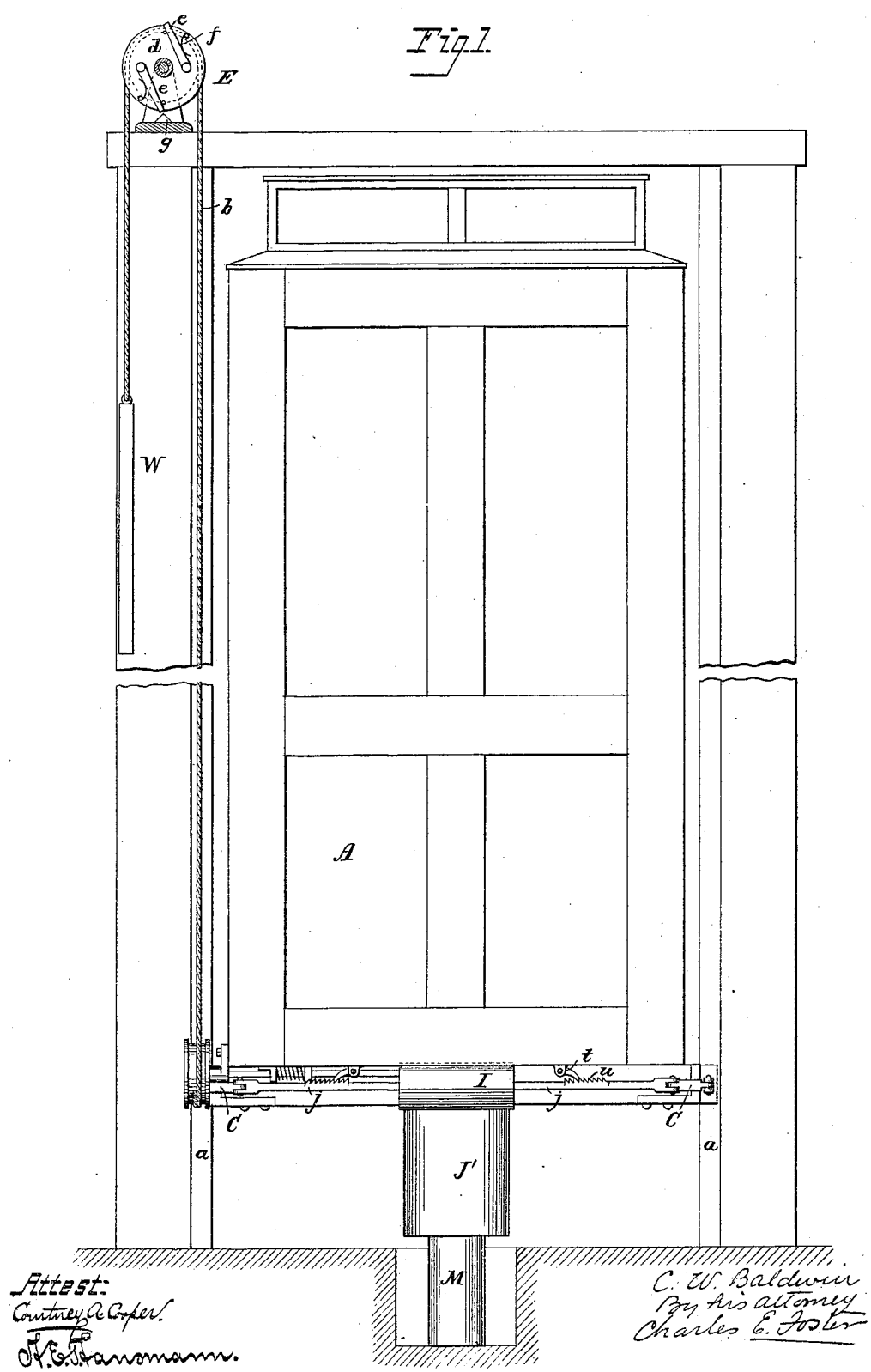

(No Model.) 3 Sheets—Sheet 2.
C. W. BALDWIN.
SAFETY APPARATUS FOR ELEVATORS.
No. 258,691. Patented May 30, 1882.
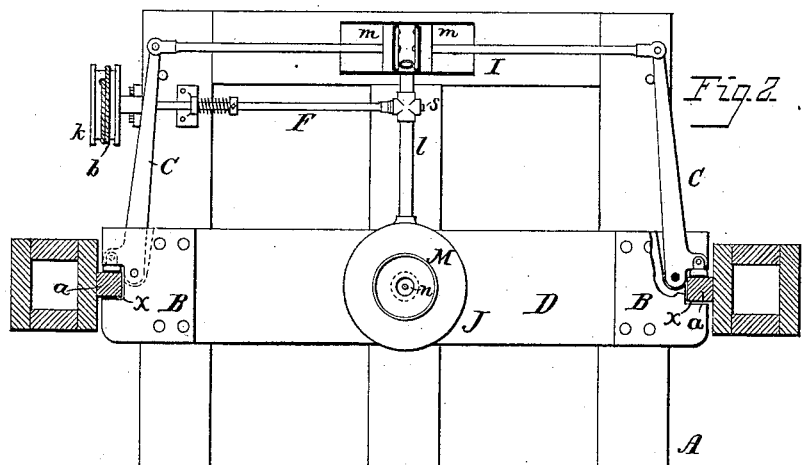
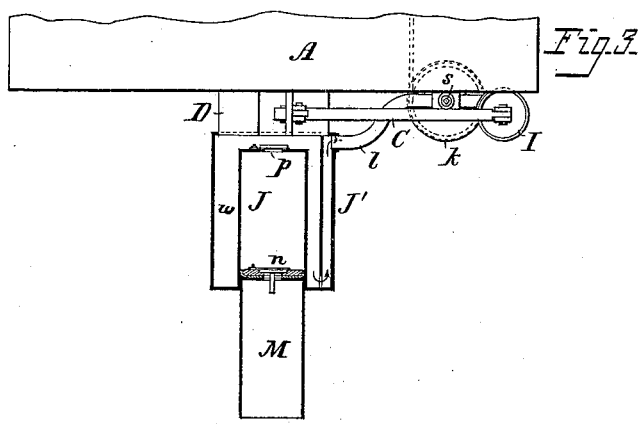
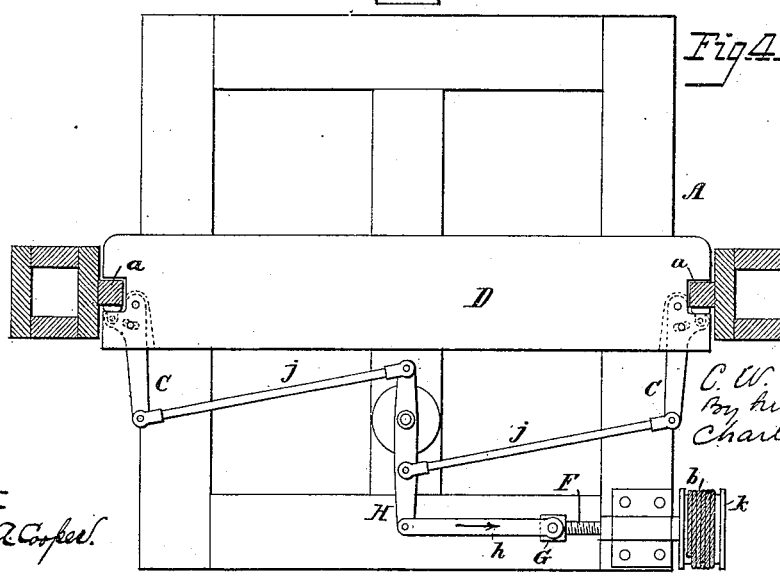

(No Model.) 3 Sheets—Sheet 3.

C. W. BALDWIN.
SAFETY APPARATUS FOR ELEVATORS.

No. 258,691. Patented May 30, 1882.

Attest:
Courtney A. Cooper
H. E. Hansmann

C. W. Baldwin
By his attorney
Charles E. Foster

UNITED STATES PATENT OFFICE.

CYRUS W. BALDWIN, OF CHICAGO, ILLINOIS.

SAFETY APPARATUS FOR ELEVATORS.

SPECIFICATION forming part of Letters Patent No. 258,691, dated May 30, 1882.

Application filed April 19, 1882. (No model.)

*To all whom it may concern:*

Be it known that I, CYRUS W. BALDWIN, a citizen of the United States, and a resident of Chicago, Cook county, Illinois, have invented certain Improvements in Safety Apparatus for Elevators, of which the following is a specification.

Figure 5:
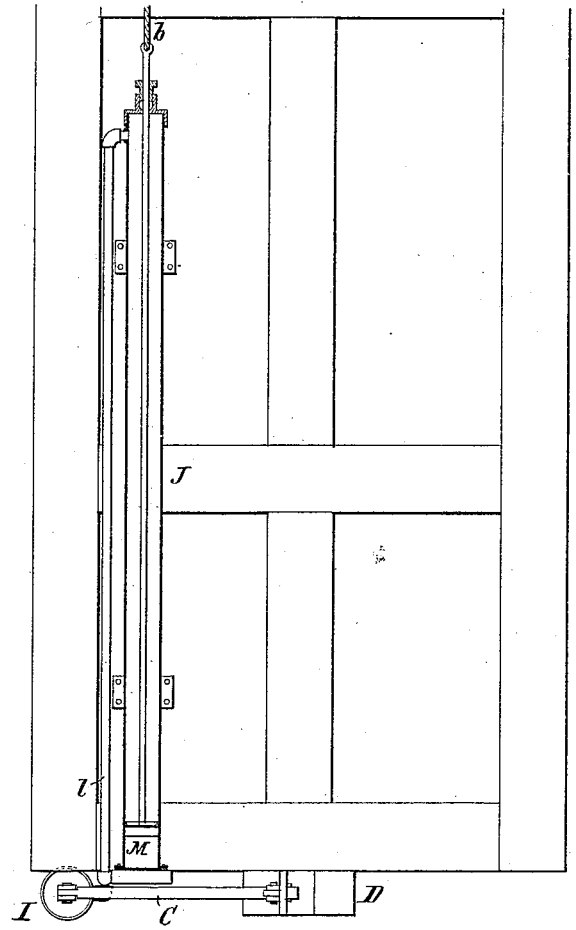
Figure 6:
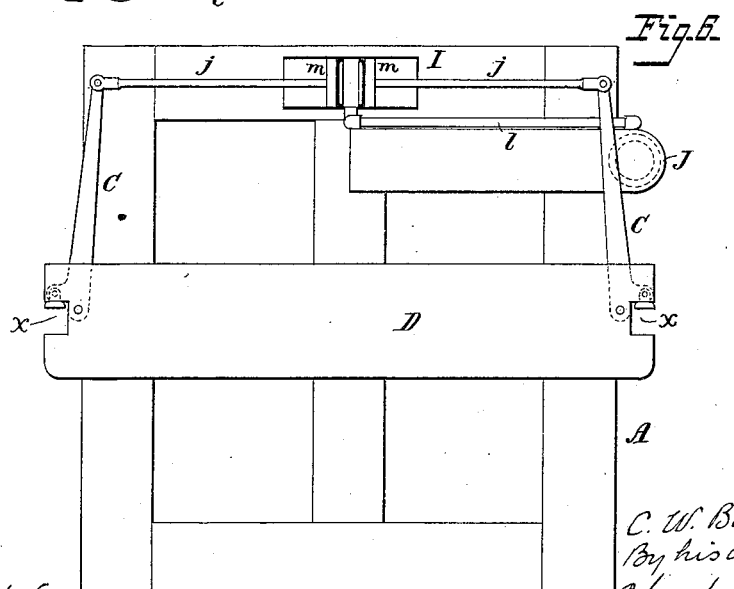

My invention has for its object to retard or arrest the movements of the cage or platform of an elevator in case of accident to any part of the mechanism, and this object I effect by appliances fully described hereinafter, whereby the brakes are caused to be at once applied should an undue speed of the cage be attained.
In the drawings, Figure 1 is an elevator showing a cage, guides, governor, and brake appliances illustrating my invention. Fig. 2 is an inverted plan, in section, through the guides and brake-cylinder. Fig. 3 is a side view of the lower part of the cage and brake appliances, the air-cylinder in section. Fig. 4 is an inverted plan, in section, through the guides, showing a modification. Fig. 5 is an elevation in part section of a cage and brake appliances, showing another modification. Fig. 6 is an inverted plan of Fig. 5, in section, through the brake-cylinder.

The cage A slides between the usual guides, $a\,a$, which extend into recesses or grooves $x$ in the guide-plates B on the safety-plank D; and levers C C are pivoted to said plates and provided with loosely-attached clamp-blocks, which, by the outward movement of the levers, may be brought against the guides as brakes to reduce the speed of the cage or to pinch the plates B tightly against the guides and arrest the cage.

The clamps may be applied and withdrawn by hand or automatically. In the drawings I have shown an automatic apparatus in the form of a revolving governor, E. This governor may be constructed in different ways, apparent to those familiar with such contrivances, it only being essential that any undue increase of speed shall effect the clamping or retarding of a rope, $b$, which, when arrested, causes the brakes to be applied. I have shown a construction which has proved to be effective, consisting in a grooved governor-pulley, $d$, mounted in bearings at the top of the well, and over this pulley passes the rope $b$, attached at one end to the lever-operating devices and at the other to a weight, W; but an endless cable may be used, passing over pulleys at the top and bottom of the well in a manner well known in this class of apparatus.

To the pulley $d$, at one side, are pivoted arms $e\,e$, and springs $f$ tend to throw said arms inward, but yield when the speed of the governor is increased, the arms being thus thrown out until one of them strikes a stop, $g$, which instantly arrests the rotation of the pulley and the movement of the rope $b$ and causes the brakes to be applied. I do not here claim the construction of this governor, as it forms the subject of a separate application for Letters Patent.

One means of applying the brakes on the stopping of the movement of the rope $b$ is shown in Fig. 4, and consists of a screw-shaft, F, turning in a box on the bottom of the cage, and carrying a traveling nut, G, pivoted to a link, $h$, connected to a lever, H, to which are also connected rods $j\,j$, attached to the ends of the brake-levers C. At the end of the shaft F is a drum, $k$, round which the rope $b$ is wound. When the travel of the rope is arrested the drum and its shaft are turned, the nut G carried outward in the direction of the arrow, and the brakes not only applied with great force, but held fixedly in the position to which they are set. I have described this as one means which may be employed; but instead of this positive action of the rope upon the levers I prefer to use a fluid-pressure device, which I will now describe.

I use a cylinder, I, which may contain one piston to operate on levers arranged as shown in Fig. 4, but preferably has two pistons, $m\,m$, as shown in Figs. 2 and 6, compressed air being admitted between them by a pipe, $l$, so as to throw them out and apply the brakes, the governor regulating the passage of the air either by a cock, $s$, turned by the shaft F, or otherwise.

To avoid the necessity of conveying air through flexible pipes from a stationary reservoir, I compress the air in a cylinder upon the cage. One mode of effecting this is shown in Fig. 3, where the compression-cylinder J is at the bottom of the cage, and is surrounded by a casing, J', to form an air-chamber, $w$, and receives a plunger-piston, M, having a valve, n, opening upward. A valve, p, opening upward is in the cylinder-head. The plunger descends by its weight, the valve n opening and admitting air to the cylinder. When the cage brings the plunger against the floor the air is forced through the cylinder and compressed in the outer chamber, w, from which it may at any time be directed to the cylinder I by the operation of the governor-rope.

The compression-cylinder J may be placed at the side of the car, as in Fig. 6, and the governor-rope b may be connected directly to the piston-rod of said cylinder, as shown, so that on the arrest of the travel of the rope the piston will be arrested, while the cylinder descends, forcing the air from the cylinder J into the brake-cylinder and applying the brakes.

To prevent any accident from the breaking of the rope b under excessive tension, I combine with the brake levers or rods detents that will hold them in place when clamped. The nut G acts as a detent in Fig. 4. In Fig. 1 are shown pawls t, which engage with racks u on the rods j.

While I have referred to the use of air in the compression and brake cylinders, glycerine, water, or other fluid may be employed, especially in the construction shown in Fig. 5; or both may be used in the construction shown in Figs. 1 to 3, the air pressing upon the liquid.

I do not claim all the special devices above described, as those not herein claimed will form the subjects of separate applications for Letters Patent; but

I claim—

1. In a safety apparatus for elevators having brake-levers arranged upon the cage to clamp or clutch the guides, the combination, with such levers, of one or more detents, constructed to retain the levers in the positions to which they are set by the safety appliances, as set forth.

2. The combination, with the brakes of an elevator-cage, of a brake-cylinder, a cylinder communicating with the brake-cylinder, and a piston and connections, as specified, whereby the motion of the piston may be arrested, while that of the cage is continued, as and for the purpose set forth.

3. The combination of the brakes, brake-cylinder, air-compression cylinder communicating therewith, operating-rope b, governor, and appliances, constructed and arranged as described, whereby the brake-cylinder is supplied with air under pressure when the travel of the rope is arrested.

4. The combination of the cage, brake-levers, brake-cylinder, governor, operating-rope b, and a cylinder containing the operating-fluid and provided with a piston connected to the rope b, substantially as specified.

5. The combination of the brake-levers, governor, and operating-rope b, and a shaft, F, connected with the brake-operating appliances and carrying a drum round which the rope b is wound, as set forth.

In testimony whereof I have signed my name to this specification in the presence of two subscribing witnesses.

CYRUS W. BALDWIN.

Witnesses:
HENRY L. KENT,
HOLMES HOGE.